(12) United States Patent
Kim (10) Patent No.: US 10,162,093 B2
(45) Date of Patent: Dec. 25, 2018

(54) DISPLAY DEVICE (71) Applicant: Samsung Display Co., Ltd., Yongin-si, Gyeonggi-do (KR)

(72) Inventor: Mugyeom Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/484,216

(22) Filed: Apr. 11, 2017

(65) Prior Publication Data

US 2017/0293065 A1    Oct. 12, 2017

(30) Foreign Application Priority Data

Apr. 11, 2016   (KR) .................. 10-2016-0044353

(51) Int. Cl.
| | |
|---|---|
| *G02F 1/133* | (2006.01) |
| *F21V 8/00* | (2006.01) |
| *G02F 1/1333* | (2006.01) |
| *G02F 1/1335* | (2006.01) |
| *G02F 1/1343* | (2006.01) |
| *G02F 1/1368* | (2006.01) |

(52) U.S. Cl.
CPC ......... *G02B 6/0021* (2013.01); *G02B 6/0031* (2013.01); *G02B 6/0073* (2013.01); *G02B 6/0083* (2013.01); *G02F 1/1368* (2013.01); *G02F 1/133308* (2013.01); *G02F 1/133504* (2013.01); *G02F 1/133553* (2013.01); *G02F 1/133615* (2013.01); *G02F 1/134309* (2013.01); *G02F 1/133345* (2013.01); *G02F 2001/133302* (2013.01)

(58) Field of Classification Search
None
See application file for complete search history.

(56) References Cited

U.S. PATENT DOCUMENTS

| | | | |
|---|---|---|---|
| 6,523,966 B1 * | 2/2003 | Satoh .................. | G02B 6/0016 349/64 |
| 6,671,013 B1 * | 12/2003 | Ohkawa ............... | G02B 6/0036 349/62 |
| 7,800,711 B2 | 9/2010 | Kim | |
| 7,934,862 B2 | 5/2011 | Anandan | |
| 2013/0033901 A1 * | 2/2013 | Nishitani ............. | G02B 6/0036 362/613 |

FOREIGN PATENT DOCUMENTS

| | | |
|---|---|---|
| JP | 4279761 B2 | 3/2009 |
| JP | 2010141784 A | 6/2010 |
| KR | 1020080083411 A | 9/2008 |

\* cited by examiner

*Primary Examiner* — James Dudek (74) *Attorney, Agent, or Firm* — Cantor Colburn LLP (57) ABSTRACT

A display device includes: a display substrate through which light propagates at an inner area thereof, the display substrate including a lateral surface through which the light is incident; a display unit which is on the display substrate and generates and displays an image with the light propagated through the display substrate; and a light source which is disposed at the lateral surface of the display substrate and generates and irradiates the light to the display substrate.

14 Claims, 3 Drawing Sheets

DISPLAY DEVICE

This application claims priority to Korean Patent Application No. 10-2016-0044353, filed on Apr. 11, 2016, and all the benefits accruing therefrom under 35 U.S.C. § 119, the content of which in its entirety is herein incorporated by reference.

BACKGROUND

1. Field

One or more embodiments relate to a display device.

2. Description of the Related Art

Generally, display devices include liquid crystal display ("LCD") devices, organic light-emitting display devices ("OLED"s), electrophoretic displays ("ED"s), surface-conduction electron-emitter displays ("SED"s), vacuum fluorescent displays ("VFD"s), etc.

Display devices may be used for mobile apparatuses such as smart phones, tablet personal computers, lap-top computers, digital cameras, camcorders, and personal digital assistants ("PDA"s), and electronic apparatuses such as desk-top computers, televisions, outdoor billboards, display devices for exhibition, dashboards for automobile and head up displays ("HUD"s).

Research into display devices having a relatively thin profile has been conducted. Particularly, various shapes for reducing the overall thickness of a display device have been suggested.

SUMMARY

One or more embodiments include a display device having a reduced overall thickness.

According to one or more embodiments, a display device includes: a display substrate through which light propagates at an inner area thereof, the display substrate including a lateral surface through which the light is incident; a display unit which is on the display substrate and generates and displays an image with the light propagated through the display substrate; and a light source which is disposed at the lateral surface of the display substrate and generates and irradiates the light to the display substrate.

In a thickness direction of the display substrate, a total thickness of the light source may be less than a total thickness of the display substrate, and the light source may directly irradiate light into the display substrate via the lateral surface of the display substrate.

The light source may be disposed in plurality along the lateral surface of the display substrate.

The lateral surface of the display substrate may include a receiving recess, and the light source may be received in the receiving recess.

The receiving recess may be recessed from the lateral surface of the display substrate in a direction parallel to a plane in which the display substrate is arranged.

The display device may further include a reflective plate on the lateral surface of the display substrate. In a thickness direction view of the display substrate, the lateral surface of the display substrate may include a slope surface, the reflective plate may be on the slope surface, and the light source may be below the display substrate and overlapping the reflective plate.

The reflective plate may be disposed at a slope angle to reflect light irradiated from the light source to the lateral surface of the display substrate.

The display substrate may further include a first surface on which the display unit is arranged and through which the propagated light exits from the display substrate, and a second surface opposite the first surface. The light source may include a first contact electrode, a second contact electrode, and a p-n diode electrically connected to the first and second contact electrodes. The display substrate may further include a first pad and a second pad which are disposed on the first surface at an edge thereof and electrically connected to the display unit. The first contact electrode may be electrically connected to the first pad by a first connection line, and the second contact electrode may be electrically connected to the second pad by a second connection line.

The display device may further include a housing which surrounds the lateral surface of the display substrate and defines a region in which the light source is arranged and a region in which the contact electrodes are connected to the pads.

The display device may further include a resin fixing member connected to the lateral surface of the display substrate. The light source may be disposed in the resin fixing member to fix a position of the light source relative to the lateral surface of the display substrate.

The display substrate may further include a scattering pattern on the second surface thereof, and the scattering pattern may scatter the propagated light at the inner area of the display substrate.

The display unit may include a thin film transistor which controls generation of the image and an insulating layer covering the thin film transistor. The insulating layer may include a scatterer which scatters light that exits from the display substrate.

The display substrate may further include a first surface on which the display unit is arranged and through which the light exits from the display substrate, and a second surface opposite the first surface. The display device may further include a scattering pattern which is on the second surface of the display substrate and scatters the propagated light at the inner area of the display substrate.

The display device may further include a reflective plate which is under the second surface of the display substrate and covers the scattering pattern on the second surface of the display substrate.

The display device may further include a pad which is disposed on the first surface of the display substrate and electrically connected to the display unit. The light source may include a first contact electrode, a second contact electrode, and a p-n diode electrically connected to the first and second contact electrodes. The reflective plate may include a conductive material and be electrically connected to an external apparatus which controls a function of the display device, the first contact electrode may be electrically connected to the pad, and the second contact electrode may be electrically connected to the reflective plate.

The display device may further include a first connection line which extends between and electrically connects the first contact electrode of the light source to the pad disposed on the first surface of the display substrate, and a second connection line which extends between electrically connects the second contact electrode of the light source to the reflective plate which is under the second surface of the display substrate. The extended first and second connection lines may surround the lateral surface of the display substrate.

The display substrate may further include a first surface on which the display unit is arranged and through which the light exits from the display substrate, and a second surface opposite the first surface. The lateral surface may connect the first surface to the second surface.

The display substrate may further include a light-guiding pattern on the second surface thereof. The light-guiding pattern may propagate the light within the inner area of the display substrate which is incident to the display substrate via the lateral surface thereof.

The display device may further include a plate on the second surface of the display substrate and covering the light-guiding pattern, the plate guiding light from the second surface of the display substrate to the first surface thereof.

The display unit may include an optical medium layer which controls transmittance of the propagated light from the display substrate which is incident to the display unit to display the image.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

As the present disclosure allows for various changes and numerous embodiments, exemplary embodiments will be illustrated in the drawings and described in detail in the written description. An effect and a characteristic of the present disclosure, and a method of accomplishing these will be apparent when referring to embodiments described with reference to the drawings. This present disclosure may, however, be embodied in many different forms and should not be construed as limited to the exemplary embodiments set forth herein.

Hereinafter, the present disclosure will be described more fully with reference to the accompanying drawings, in which exemplary embodiments of the present disclosure are shown. When description is made with reference to the drawings, like reference numerals in the drawings denote like or corresponding elements, and repeated description thereof will be omitted.

It will be understood that when a layer, region, or component is referred to as being "on," another layer, region, or component, it can be directly or indirectly on the other layer, region, or component. That is, for example, intervening layers, regions, or components may be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Sizes of elements in the drawings may be exaggerated for convenience of explanation. In other words, since sizes and thicknesses of components in the drawings are arbitrarily illustrated for convenience of explanation, the following embodiments are not limited thereto.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In the following examples, directions of the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

In general, a display device may include a display area at which an image is generated and displayed, and a non-display area at which the image is not generated or displayed. A display substrate of a display device may include both the display and non-display areas. A display unit of a display device may be disposed in the display area, and a planar area of the display unit may define the display area of the display device and/or the display substrate. A planar area of the display device and/or the display substrate except for the display area may define the non-display area thereof. A light source, wirings and pads through which power and/or signals are provided to the light source or the display unit and other peripheral components of the display device may be disposed in the non-display area.

Figure 1:
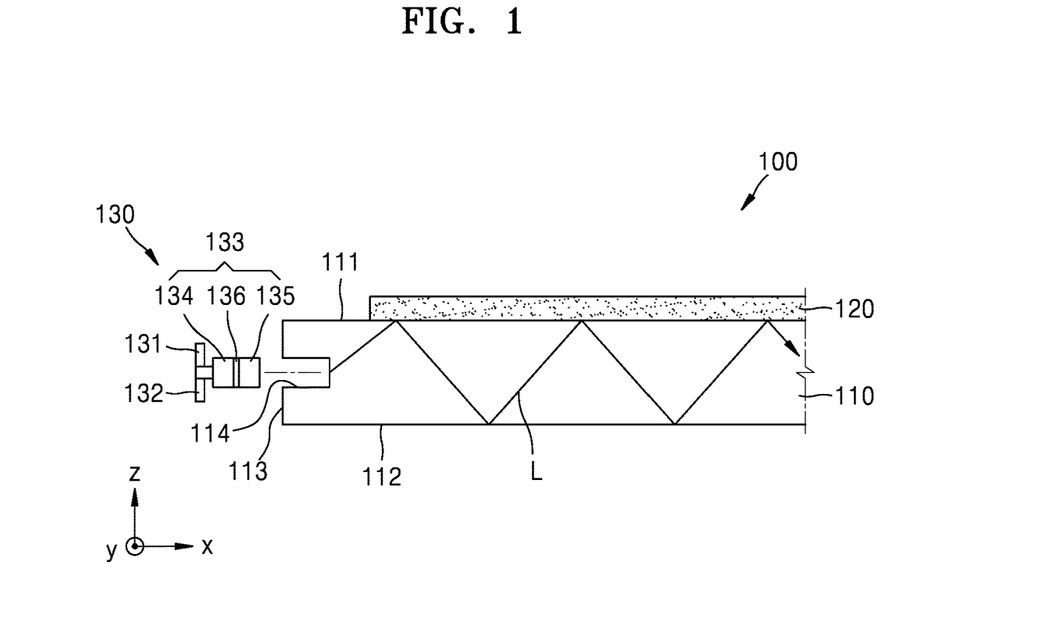
FIG. 1 is a cross-sectional view of an embodiment of a portion of a display device according to the invention.

FIG. 1 is a cross-sectional view of a display device 100 according to the invention. More particularly, FIG. 1 is a cross-sectional view of the display device 100 at an edge portion thereof.

Referring to FIG. 1, the display device 100 may include a display substrate 110, a display layer 120 (hereinafter referred to as a "display unit" on the display substrate 110, and a light source such as a light-emitting diode ("LED") 130 at a lateral surface 113 of the display substrate 110.

In an embodiment, the display device 100 may be a liquid crystal display ("LCD") panel. However, the display device 100 may be any among light-receiving display devices.

The display substrate 110 may be a polymer substrate or a glass substrate. The display substrate 110 may be transparent. The display substrate 110 may include a first surface 111 and a second surface 112 which is opposite the first surface 111. The first surface 111 may be parallel to the second surface 112. The first surface 111 may be connected to the second surface 112 by the lateral surface 113. Light exits the display substrate 110 through the first surface 111 thereof. The exiting light may be considered as being directly provided to the display unit 120 from the display substrate 110.

The first and second surfaces 111 and 112 may each be disposed in a plane defined by two crossing directions (e.g., x-axis and y-axis direction, while the lateral surface 113 is disposed in a plane defined with one of the two crossing directions, a third direction (e.g., z-axis) which is perpendicular to both of the crossing directions. Referring to FIG. 1, for example, parallel planes of the first and second surfaces 111 and 112 may be defined in a first (horizontal in FIG. 1 or x-axis) direction and in a second direction (into the page of FIG. 1 or y-axis). A third (z-axis) direction may extend vertical in FIG. 1.

The display unit 120 may include optical medium layer and a driving (or switching) layer which controls the optical medium layer to transmit or block light therethrough. In an embodiment, the display unit 120 includes a liquid crystal layer as the optical medium layer, and at least one thin film transistor ("TFT") and a plurality of electrodes within the driving layer. The display unit 120 may be on the first surface 111 of the display substrate 110.

In a view along the third direction (e.g., a top plan view), the display device 100 may have multiple sides connected to each other. The sides of the display device 100 may be defined by multiple lateral surfaces of the display substrate 110 which are connected to each other. In one embodiment, the multiple lateral surfaces of the display substrate 110 may define a rectangular shape in the top plan view. The LED 130 may be at one or more lateral surface 113 of the display substrate 110. The LED 130 may generate and irradiate light to the display substrate 110.

The LED 130 may emit light of a predetermined wavelength ranging from an ultraviolet ("UV") ray to visible light. The LED 130 may include a micro LED.

The LED 130 may include a first contact electrode 131, a second contact electrode 132, and a p-n diode 133 between the first and second contact electrodes 131 and 132.

The p-n diode 133 may include a lower p-doped layer 134, an upper n-doped layer 135, and at least one quantum well layer 136 between the p-doped layer 134 and the n-doped layer 135. In an embodiment, the lower doped layer 134 may be an n-doped layer, and the upper doped layer 135 may be a p-doped layer.

A size or dimension of the LED 130 in a direction may be relatively less than that of the display substrate 110 in the same direction. Specifically, a total thickness (vertical in FIG. 1) of the LED 130 is parallel to the total thickness direction (vertical in FIG. 1) of the display substrate 110 and may be less than the total thickness of the display substrate 110. The LED 130 may be adjacent to the lateral surface 113 of the display substrate 110. The LED 130 may directly irradiate light to the display substrate 110 via the lateral surface 113 of the display substrate 110. In an embodiment, the LED 130 may be mounted on a circuit board (not shown) which provides power and/or signals to the LED 130 for generating and/or emitting light.

The display device 100 does not require a separate light guide plate since the display substrate 110 may serve and function as a light guide plate. That is, light emitted from the LED 130 to the lateral surface 113 may be transmitted from the lateral surface 113 and through an inner area of the display substrate 110. The display device 100 may be an edge light type display device in which the LED 130 is at one or more lateral surface 113 of the display substrate 110.

The LED 130 may be provided in plurality along a single one lateral surface 113 of the display substrate 110. Referring to FIG. 1, for example, although one LED 130 is visible in the plane defined by the x-axis and z-axis directions, a plurality of LEDs 130 may be arranged in the y-axis direction. In another embodiment, at least one LED 130 may be provided at both of opposing lateral surfaces of the display substrate 110 which face each other in the top plan view.

The LED 130 may be arranged in a receiving recess 114 defined at the lateral surface 113 of the display substrate 110. Surfaces of the display substrate 110 which define the receiving recess 114 may be considered portions of the lateral surface 113. Specifically, the receiving recess 114 has a predetermined depth extended into the display substrate 110 from the lateral surface 113. The receiving recess 114 may be recessed from the lateral surface 113 in a direction parallel to a plane in which the display substrate 110 is arranged. The receiving recess 114 may be a recess extended to the inner area of the display substrate 110 from the lateral surface 113 of the display substrate 110. The depth of the receiving recess 114 extends horizontally in FIG. 1. Dimensions such as a length and width of the receiving recess 114 may variously extend in a vertical direction of FIG. 1 and into the page of FIG. 1.

The LED 130 may be received in the receiving recess 114. Since the LED 130 is received in the receiving recess 114, damage to the LED 130 may be reduced or effectively prevented and the location of the LED 130 may be easily aligned with a position of the display substrate 110.

In the display device 100 having the above structure, light L irradiated from the LED 130 which is received in the receiving recess 114 is total-internal reflected at the inside of the display substrate 110 (shown by the zig-zag arrow in FIG. 1). The light L transmitted through the inside of the display substrate 110 may propagate toward the display unit 120 on the first surface 111 of the display substrate 110.

A separate element for improving light brightness or making uniform light brightness may be additionally arranged on the second surface 112 of the display substrate 110. In one embodiment, for example, a specific pattern (not shown) such as a scattering pattern may be arranged on the second surface 112, or a plate (not shown) such as a reflective plate covering the specific pattern and guiding irradiated light L toward the first surface 111 of the display substrate 110 may be additionally arranged on the second surface 112, but the embodiment is not limited thereto.

Figure 2:
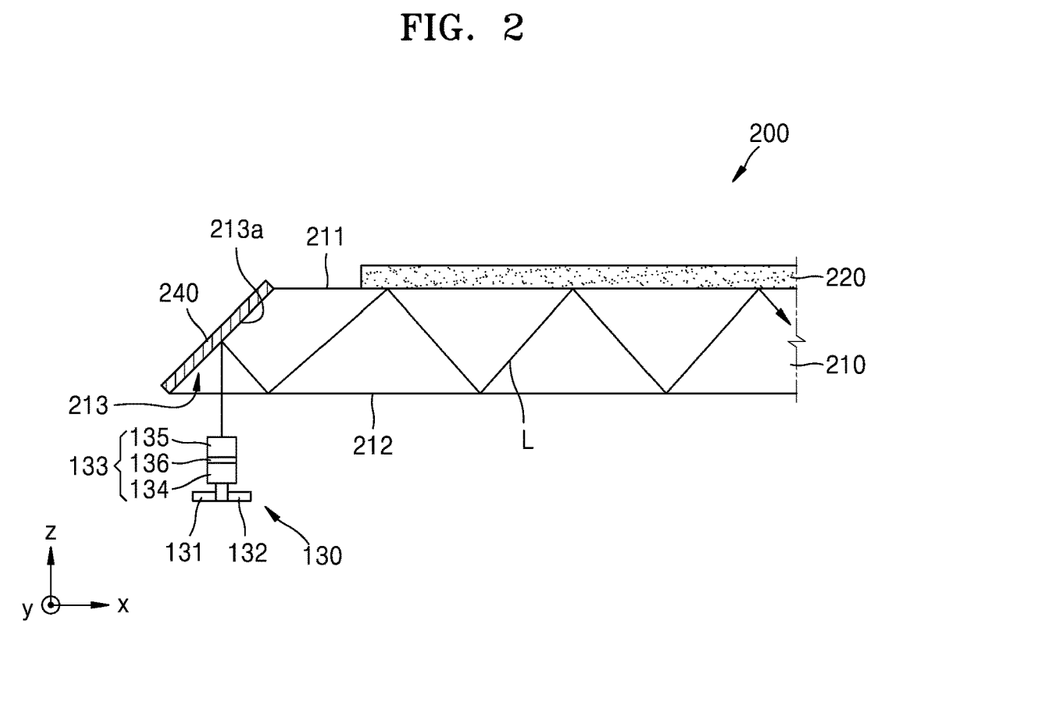
FIG. 2 is a cross-sectional view of another embodiment of a portion of a display device according to the invention.

FIG. 2 is a cross-sectional view of another embodiment of a portion of a display device 200 according to the invention. More particularly, FIG. 2 is a cross-sectional view of the display device 200 at an edge portion thereof.

Hereinafter, same reference numerals or terms as those in FIG. 1 indicate the same elements performing the same functions, and primary characteristic parts of each embodiment are mainly described.

Referring to FIG. 2, the display device 200 may include a display substrate 210, a display unit 220 on the display substrate 210, and the LED 130 at a lateral surface 213 of the display substrate 210.

The display substrate 210 may include a first surface 211 on which the display unit 220 is arranged, and a second surface 212 opposite the first surface 211. The first surface 211 may be connected to the second surface 212 by the lateral surface 213. In an embodiment, the display unit 220 may include a liquid crystal layer.

The lateral surface 213 of the display substrate 210 may define a slope surface 213*a*. The first surface 211 and the slope surface 213*a* may form an obtuse angle. The LED 130 may be below a portion of the second surface 212 of the display substrate 210 that corresponds to the slope surface 213*a* in the thickness (e.g., vertical in FIG. 2) direction. In an embodiment, portions of the LED 130 may be arranged in a direction perpendicular to a direction in which the display substrate 210 is arranged. Referring to FIG. 2, for example, contact electrode, lower doped layer, quantum well layer and upper doped layer portions of the LED 130 are arranged in a vertical direction which is perpendicular to a plane in which the display substrate 210 is arranged. In contrast, portions of the LED 130 in FIG. 1 are arranged parallel to a plane in which the display substrate 110 is arranged.

A reflective plate 240 may be on the slope surface 213*a*. In an embodiment, the reflective plate 240 may be a reflective mirror. The reflective plate 240 may be attached on the slope surface 213*a* by using an adhesive (not shown). The reflective plate 240 be disposed in a plane at a slope angle that may reflect light irradiated from the LED 130 to the lateral surface 213 of the display substrate 210.

In the display device 200 having the above structure, light L is irradiated from the LED 130 arranged below the display substrate 210, and the light L may be reflected by the reflective plate 240 and propagate into the display substrate 210 through the lateral surface 213 thereof. The lateral surface 213 may otherwise be referred to as a light incident surface of the display substrate 210.

A separate element (not shown) that may improve light efficiency, such as a scattering pattern, a reflective pattern, a scattering plate, a reflective plate, a prism sheet or a diffuser sheet may be further provided on the second surface 212 of the display substrate 210.

Figure 3:
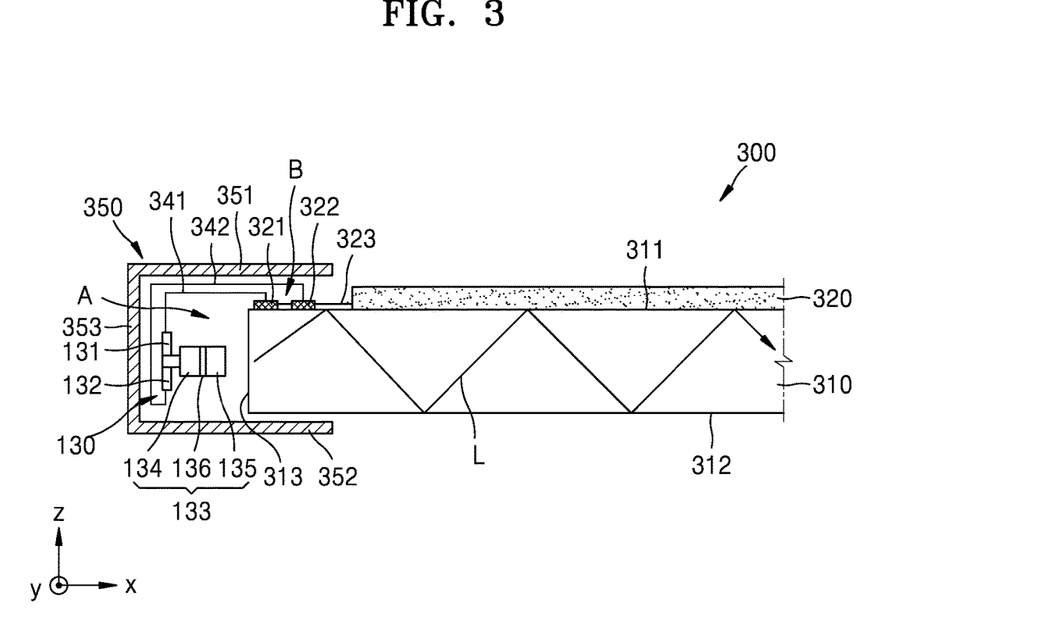
FIGS. 3 to 5 are cross-sectional views of still other embodiments of a portion of a display device according to the invention.

FIG. 3 is a cross-sectional view of still another embodiment of a portion of a display device 300 according to the invention. More particularly, FIG. 3 is a cross-sectional view of the display device 300 at an edge portion thereof.

Hereinafter, same reference numerals or terms as those of previous embodiments indicate the same elements performing the same functions, and primary characteristic parts of each embodiment are mainly described.

Referring to FIG. 3, the display device 300 includes a display substrate 310, a display unit 320 on the display substrate 310, and the LED 130 at a lateral surface 313 of the display substrate 310.

The display substrate 310 includes a first surface 311 on which the display unit 320 is arranged, and a second surface 312 opposite to the first surface 311. The first surface 311 may be connected to the second surface 312 by the lateral surface 313. In an embodiment, the display unit 320 includes a liquid crystal layer.

A first pad 321 and a second pad 322 each electrically connected to the display unit 320 may be at the edge (e.g., adjacent to the lateral surface 313) of the first surface 311 of the display substrate 310. A portion of the first surface 311 is exposed to outside the display unit 320. The first and second pads 321 and 322 on the exposed portion of the first surface 311 may be connected to respective elements or layers of the display unit 320 and/or to each other via a wiring 323. In an embodiment, the first and second pads 321 and 322 may be power signal supply terminals and/or signal input terminals to which power and control or driving signals are applied for transmission to the display unit 320.

The LED 130 may completely outside of and facing the lateral surface 313 of the display substrate 310. The LED 130 may irradiate light into the display substrate 310 through the lateral surface 313 thereof.

The LED 130 may also receive power and/or signals from the first and second pads 321 and 322. Specifically, the first contact electrode 131 of the LED 130 may be electrically connected to the first pad 321 by a first connection line 341. The second contact electrode 132 of the LED 130 may be electrically connected to the second pad 322 by a second connection line 342.

A housing 350 may be disposed over the lateral surface 313 of the display substrate 310. In an embodiment, the LED 130 may be mounted inside the housing 350.

The housing 350 includes a first portion 351 overlapping the first surface 311 of the display substrate 310, a second portion 352 overlapping the second surface 312 of the display substrate 310, and a third portion 353 overlapping the lateral surface 313 of the display substrate 310, the third portion 353 connecting the first portion 351 to the second portion 352. The first portion 351, the second portion 352 and the third portion 353 may be connected as one body. The housing 350 may surround the edge portion of the display device 300 to define a region A in which the LED 130 is arranged, and a region B at which the contact electrodes 131 and 132 are connected to the pads 321 and 322.

In the display device 300 having the above structure, the LED 130 may emit light by using power supplied from the first and second pads 321 and 322, and light L irradiated from the LED 130 may propagate into the display substrate 310.

A separate element (not shown) that may improve light efficiency may be additionally provided on the second surface 312 of the display substrate 310.

Figure 4:
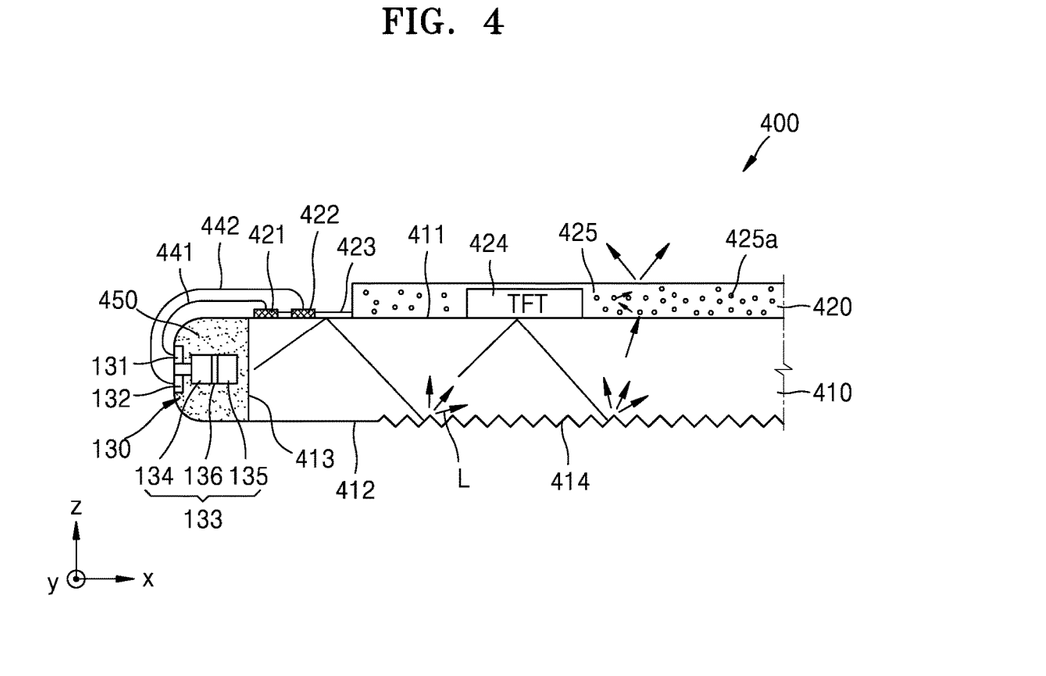

FIG. 4 is a cross-sectional view of yet another embodiment of a portion of a display device 400 according to the invention. More particularly, FIG. 4 is a cross-sectional view of the display device 400 at an edge portion thereof.

Referring to FIG. 4, the display device 400 includes a display substrate 410, a display unit 420 on the display substrate 410, and the LED 130 at a lateral surface 413 of the display substrate 410.

The display substrate 410 includes a first surface 411 on which the display unit 420 is arranged, and a second surface 412 opposite to the first surface 411. The first surface 411 may be connected to the second surface 412 by the lateral surface 413.

A first pad 421 and a second pad 422 each electrically connected to the display unit 420 may be at the edge of the first surface 411 of the display substrate 410. The first and second pads 421 and 422 may be connected to respective elements of the display unit 420 via a wiring 423.

The display unit 420 may be a display panel such as an LCD panel. In an embodiment, the display unit 420 includes a TFT 424 and an insulating layer 425 covering the TFT 424. The TFT 424 may be provided in plurality with the display unit 420. In an embodiment, the insulating layer 425 may be a planarization layer. Portions of the insulating layer 425 may extend from between adjacent TFTs 424 to be disposed overlapping the TFTs 424. The insulating layer 425 may include a scatterer 425a that may scatter light L.

The LED 130 may be completely outside of and facing the lateral surface 413 of the display substrate 410. The LED 130 may irradiate light into the display substrate 410 through the lateral surface 413 thereof. The LED 130 may be fixed in a position relative to the lateral surface 413 of the display substrate 410 by a fixing member 450, such as a resin 450. The resin 450 may surround the LED 130. The first and second contact electrodes 131 and 132 may not be covered with the resin 450 and be exposed to outside thereof (shown at the leftmost position of the resin 450 in FIG. 4).

The exposed first contact electrode 131 of the LED 130 may be electrically connected to the first pad 421 by a first connection line 441. The exposed second contact electrode 132 of the LED 130 may be electrically connected to the second pad 422 by a second connection line 442.

In an embodiment, any of a number of materials may be used for the contact electrodes 131 and 132 and for the pads 421 and 422 so long as the material has conductivity. In an embodiment, for example, instead of the connection lines 441 and 442 as discrete members, a conductive coating material may be used or the contact electrodes 131 and 132 may be connected to the pads 421 and 422 by an inkjet method including a conductive material.

In an embodiment, a pattern configured to guide light L, which propagates into the display substrate 410 via the lateral surface 413 of the display substrate 410, toward the first surface 411 of the display substrate 410 may be arranged at a lower surface of the display substrate 410.

Specifically, a scattering pattern 414 primarily scattering light L, which propagates into the display substrate 410, may be on or defined by the second surface 412 of the display substrate 410. In an embodiment, the overall scattering pattern 414 may be provided in the form of a sawtooth shape at the second surface 412 of the display substrate 410 but is not limited thereto. At the scattering pattern 414 portion of the display substrate 410, the second surface 412 may include convex and concave portions alternated to define the scattering pattern 414.

In the display device 400 having the above structure, light L irradiated from the LED 130 may be reflected by a lower surface of the wiring 423 and a lower surface of the TFT 424 of the display unit 420 and propagate into the display substrate 410. The light L propagating within the display substrate 410 may be primarily scattered by the scattering pattern 414 at the second surface 412 of the display substrate 410. Light L, which has propagated toward the display unit 420, may be secondarily scattered by the scatterer 425a of the insulating layer 425.

A separate element (not shown) for improving light efficiency may be further provided below the scattering pattern 414.

Figure 5:
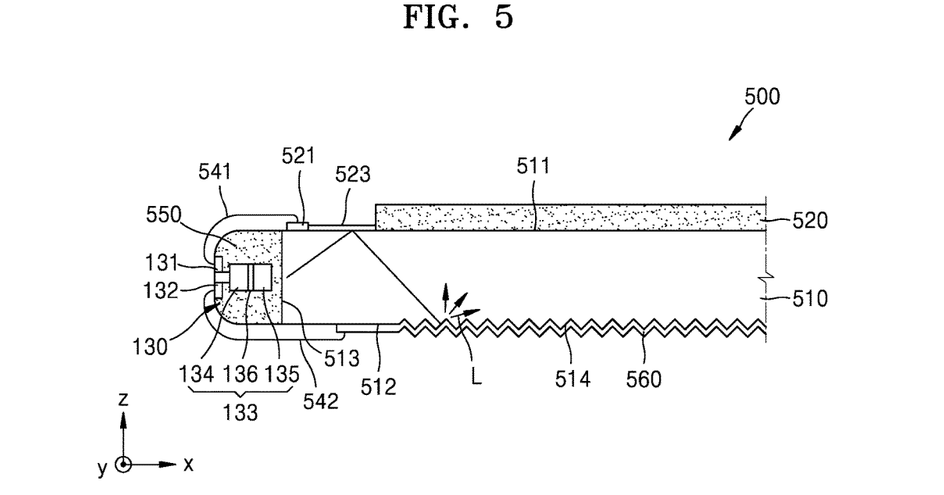

FIG. 5 is a cross-sectional view of yet another embodiment of a portion of a display device 500 according to the invention. More particularly, FIG. 5 is a cross-sectional view of the display device 500 at an edge portion thereof.

Referring to FIG. 5, the display device 500 includes a display substrate 510, a display unit 520 on the display substrate 510, and the LED 130 at a lateral surface 513 of the display substrate 510.

The display substrate 510 includes a first surface 511 on which the display unit 520 is arranged, and a second surface 512 opposite to the first surface 511. The first surface 511 may be connected to the second surface 512 by the lateral surface 513.

At least one pad 521 electrically connected to the display unit 520 may be at the edge of the first surface 511 of the display substrate 510, such as on an exposed portion of the first surface 511 at the edge thereof. The pad 521 may be connected to each element of the display unit 520 via a wiring 523. The display unit 520 may be an LCD.

The LED 130 may be completely outside and facing the lateral surface 513 of the display substrate 510. The LED 130 may irradiate light into the display substrate 510 through the lateral surface 513 thereof. The LED 130 may be fixed at a position relative to the lateral surface 513 of the display substrate 510 by a fixing member 550 such as a resin 550. The resin 550 may surround the LED 130. The first and second contact electrodes 131 and 132 may not be covered with the resin 550 and be exposed to outside thereof.

A pattern configured to guide light L, which propagates into the display substrate 510 via the lateral surface 513 of the display substrate 510, toward the first surface 511 of the display substrate 510 may be arranged at a lower surface of the display substrate 510.

Specifically, a scattering pattern 514 scattering light L, which propagates into the display substrate 510, may be on or defined by the second surface 512 of the display substrate 510. The overall scattering pattern 514 may be provided in the form of a sawtooth shape at the second surface 512 of the display substrate 510 but is not limited thereto. In an embodiment, the scattering pattern 514 may be formed by convex and concave portions alternated to define the scattering pattern 514. The convex and concave portions are defined by angled side portions disposed at a predetermined angle with respect to a plane of the display substrate 510 to condense light L, such as the prisms of a prism sheet that are configured to condense light L.

A reflective plate 560 may be further provided under the second surface 512 of the display substrate 410. The reflective plate 560 may extend from a side of the lateral surface 513 to cover the scattering pattern 514. In cross-section, the reflective plate 560 may have a shape corresponding to the shape defined by the scattering pattern 514. The reflective plate 560 may include a conductive material and serve as an electrode. The reflective plate 560 may be electrically connected to an external apparatus. In an embodiment, the reflective plate 560 may be provided on the scattering pattern 514 by coating. The external apparatus may be a member that generates, transmits and/or provides power or signals to the display device, including but not limited to, a controller which controls operation of the display device, a printed circuit board like a flexible printed circuit board, a signal generator, a power source, etc.

The first contact electrode 131 of the LED 130 may be electrically connected to the pad 521 by a first connection line 541. The second contact electrode 132 of the LED 130 may be electrically connected to the reflective plate 560 by a second connection line 542.

Any of a number of materials may be used for the first connection line 541 and the second connection line 542 so long as the material has conductivity. The first and second connection lines 541 and 542 are not limited to a specific shape or structure. The first and second connection lines 541 and 542 may surround the lateral surface 513 of the display substrate 510 in order to prevent light L irradiated from the LED 130 from being irradiated to other portions of the display device 500.

In the display device 500 having the above structure, the first contact electrode 131 is electrically connected to the pad 521 on the display substrate 510, and the second contact electrode 132 may be electrically connected to the reflective plate 560 under the display substrate 510. Light L irradiated from the LED 130 may be incident to the display substrate 510 through the lateral surface 513 to propagate within the display substrate 510. The light L within the display substrate 510 may be primarily scattered by the scattering pattern 514 at the second surface 412 of the display substrate 410 and reflected by the reflective plate 560 toward the display unit 520.

A separate element (not shown) for improving light efficiency may be further provided below the display substrate 510.

Figure 6:
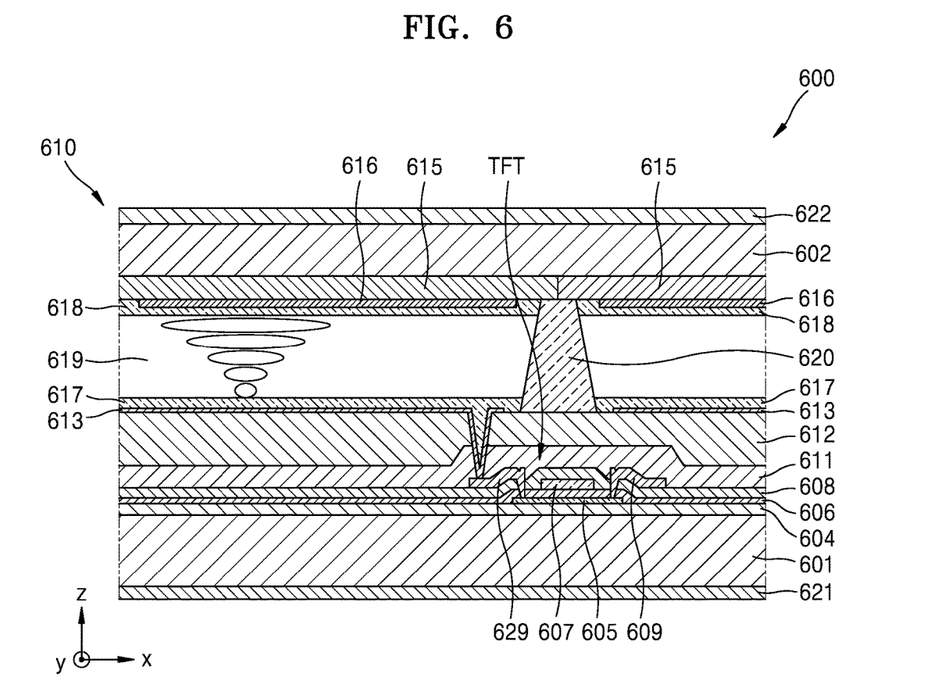
FIG. 6 is an enlarged cross-sectional view of an embodiment of a display unit of a display device according to the invention.

FIG. 6 is an enlarged cross-sectional view of an embodiment of a display unit 610 of a display device 600 according to the invention.

Referring to FIG. 6, the display device 600 includes the display unit 610 having a liquid crystal layer 619 on a display substrate 601. The display unit 610 may be disposed in the display area of the display device 600 and/or the display substrate 610.

The display substrate 601 includes a glass substrate or a polymer substrate.

A barrier layer 604 may be on the display substrate 601. The barrier layer 604 may planarize the surface of the display substrate 601 and reduce or effectively prevent penetration of impurities thereto.

A TFT may be on the barrier layer 604.

Specifically, a semiconductor active layer 605 may be on the barrier layer 604. The semiconductor active layer 605 may be an organic semiconductor, an inorganic semiconductor or amorphous silicon. In an embodiment, the semiconductor active layer 605 may be an oxide semiconductor.

A gate insulating layer 606 may be on the semiconductor active layer 605. The gate insulating layer 606 may include an inorganic layer.

A gate electrode 607 may be on the gate insulating layer 606. The gate electrode 607 may include a metallic material having relatively excellent conductivity. The gate electrode 607 may be disposed as a single layer or multiple layers.

An interlayer insulating layer 608 may be on the gate electrode 607. The interlayer insulating layer 608 may include an inorganic layer or an organic layer.

A source electrode 609 and a drain electrode 629 may be on the interlayer insulating layer 608. Specifically, in a method of manufacturing a display device, contact holes are formed by removing portions of the gate insulating layer 606 and/or portions of the interlayer insulating layer 608, and the source electrode 609 and the drain electrode 629 may be respectively electrically connected to a source region and a drain region of the semiconductor active layer 605, respectively, at the contact holes.

A passivation layer 611 may be on the source electrode 609 and the drain electrode 629. The passivation layer 611 may include an inorganic layer or an organic layer. A planarization layer 612 may be on the passivation layer 611. One of the passivation layer 611 and the planarization layer 612 may be omitted.

In a method of manufacturing a display device, a contact hole is formed by removing a portion of the passivation layer 611 and/or a portion of the planarization layer 612, and a first electrode 613 may be electrically connected to the source electrode 609 or the drain electrode 610 at the contact hole.

A sealing substrate 602 may be over the display substrate 601. A color filter 615 may be under the sealing substrate 602. A second electrode 616 may be under the color filter 615.

A first alignment layer 617 may be on the first electrode 613. A second alignment layer 618 may be over the first electrode 613. A liquid crystal layer 619 may be between the first alignment layer 617 and the second alignment layer 618. A spacer 620 dividing the liquid crystal layer 619 within the display unit 620 may be between the planarization layer 612 and the color filter 615.

A first polarization plate 621 may be on the outer surface of the display substrate 601. A second polarization plate 622 may be on the outer surface of the sealing substrate 602.

For a relatively lightweight and slim profile (e.g., overall thickness) LCD device, the LCD device may be manufactured as including a single one substrate. In an embodiment, for example, a microcavity may be formed in plurality in a display substrate, liquid crystal is dropped into the microcavities, and a color filter, a black matrix, a common electrode, etc. may be arranged on the display substrate.

Since one or more embodiment of a display device according to the invention has a structure in which a light-emitting diode is provided at a lateral surface of a display substrate and the display substrate itself functions as a light guide plate, the display device may have an overall reduced thickness and reduced weight as omitting a separate light guide plate of a conventional display device.

The effect of the embodiments may be readily derived from the description with reference to the drawings as well as the above descriptions.

What is claimed is:
1. A display device comprising:
a display substrate through which light propagates at an inner area thereof, the display substrate comprising:
a lateral surface through which the light is incident,
a first surface through which the propagated light exits from the display substrate,
a second surface opposite the first surface, and
a pad through which a signal is transmitted, disposed on the first surface of the display substrate, the pad of comprising a first pad and a second pad which are each disposed on the first surface of the display substrate at an edge thereof adjacent to the lateral surface;
a display unit which is on the first surface of the display substrate and generates and displays an image with the light propagated through and exited from the display substrate, the display unit being electrically connected to each of the first pad and the second pad of the pad of the display substrate;
a light source which is disposed at the lateral surface of the display substrate and generates and irradiates the light to the display substrate through the lateral surface of the display substrate, the light source comprising a first contact electrode, a second contact electrode, and a p-n diode electrically connected to the first and second contact electrodes;
a first connection line which electrically connects the first contact electrode of the light source to the first pad, and
a second connection line which electrically connects the second contact electrode of the light source to the second pad,
wherein in a thickness direction of the display substrate, a total thickness of the light source is less than a total thickness of the display substrate.

2. The display device of claim 1, wherein the light source is disposed in plurality along the lateral surface of the display substrate.

3. The display device of claim 1, further comprising a housing which surrounds the lateral surface of the display substrate, the housing defining a region in which the light source is arranged and a region in which the first and second contact electrodes of the light source are respectively connected to the first and second pads,
wherein the light source arranged in the housing directly irradiates light to the display substrate through the lateral surface of the display substrate.

4. A display device comprising:
a display substrate through which light propagates at an inner area thereof, the display substrate comprising:
a lateral surface through which the light is incident,
a first surface through which the propagated light exits from the display substrate,
and
a pad through which a signal is transmitted, disposed on the first surface of the display substrate;
a resin fixing member connected to the lateral surface of the display substrate;
a display unit which is on the first surface of the display substrate and generates and displays an image with the light propagated through and exited from the display substrate, the display unit being connected to the pad of the display substrate; and
a light source which is disposed at the lateral surface of the display substrate and generates and irradiates the light to the display substrate through the lateral surface of the display substrate,
wherein
the light source is disposed in the resin fixing member to fix a position of the light source relative to the lateral surface of the display substrate, and
in a thickness direction of the display substrate, a total thickness of the light source is less than a total thickness of the display substrate.

5. The display device of claim 4, wherein the display substrate further comprises:
a second surface opposite the first surface, and
a scattering pattern on the second surface thereof, wherein the scattering pattern scatters the propagated light at the inner area of the display substrate.

6. The display device of claim 5, wherein the display unit comprises a thin film transistor which controls generation of the image and an insulating layer which covers the thin film transistor,
wherein the insulating layer comprises a light scatterer which scatters the exited light from the display substrate.

7. The display device of claim 1,
further comprising a scattering pattern which is on the second surface of the display substrate and scatters the propagated light at the inner area of the display substrate.

8. The display device of claim 7, further comprising a reflective plate which is under the second surface of the display substrate and covers the scattering pattern on the second surface of the display substrate.

9. A display device comprising:
a display substrate through which light propagates at an inner area thereof, the display substrate comprising:
a lateral surface through which the light is incident,
a first surface through which the propagated light exits from the display substrate,
a second surface opposite the first surface,
and
a pad through which a signal is transmitted, disposed on the first surface of the display substrate;
a display unit which is on the first surface of the display substrate and generates and displays an image with the light propagated through and exited from the display substrate, the display unit being connected to the pad of the display substrate;
a scattering pattern which is on the second surface of the display substrate and scatters the propagated light at the inner area of the display substrate;
a reflective plate which is under the second surface of the display substrate and covers the scattering pattern on the second surface of the display substrate, the reflective plate comprising a conductive material and being electrically connected to an external apparatus which controls a function of the display device; and
a light source which is disposed at the lateral surface of the display substrate, generates light and irradiates the light to the display substrate through the lateral surface of the display substrate, the light source comprising:
a first contact electrode electrically connected to the pad disposed on the first surface of the display substrate,
a second contact electrode electrically connected to the reflective plate which is electrically connected to the external apparatus, and
a p-n diode electrically connected to the first and second contact electrodes,
wherein in a thickness direction of the display substrate, a total thickness of the light source is less than a total thickness of the display substrate.

10. The display device of claim 9, further comprising
a first connection line which extends between and electrically connects the first contact electrode of the light source to the pad disposed on the first surface of the display substrate,
a second connection line which extends between and electrically connects the second contact electrode of the light source to the reflective plate which is under the second surface of the display substrate, wherein the extended first and second connection lines surround the lateral surface of the display substrate.

11. The display device of claim 1, wherein the lateral surface through which the light is incident to the display substrate connects the first surface to the second surface.

12. The display device of claim 11, wherein the display substrate further comprises a light-guiding pattern on the second surface of the display substrate, wherein the light-guiding pattern propagates the light within the inner area of the display substrate which is incident to the display substrate via the lateral surface thereof.

13. The display device of claim 12, further comprising a plate on the second surface of the display substrate and covering the light-guiding pattern, the plate guiding light from the second surface of the display substrate to the first surface thereof.

14. The display device of claim 1, wherein the display unit comprises an optical medium layer which controls transmittance of the propagated light from the display substrate which is incident to the display unit to display the image.

* * * * *